US006869712B2

(12) United States Patent
Mittelstadt et al.

(10) Patent No.: US 6,869,712 B2
(45) Date of Patent: Mar. 22, 2005

(54) ION EXCHANGE SYSTEM STRUCTURE WITH A MICROTEXTURED SURFACE, METHOD OF MANUFACTURE, AND METHOD OF USE THEREOF

(75) Inventors: Laurie S. Mittelstadt, Belmont, CA (US); Joshua W. Smith, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 137 days.

(21) Appl. No.: 10/091,485

(22) Filed: Mar. 7, 2002

(65) Prior Publication Data

US 2003/0170519 A1 Sep. 11, 2003

(51) Int. Cl.[7] .................................................. H01M 8/10
(52) U.S. Cl. .............................. 429/30; 429/33; 429/40
(58) Field of Search ............................... 429/30, 33, 40

(56) References Cited

U.S. PATENT DOCUMENTS

| | | | |
|---|---|---|---|
| 4,673,624 A | | 6/1987 | Hockaday |
| 5,473,138 A | | 12/1995 | Singh et al. |
| 5,733,609 A | | 3/1998 | Wang |
| 6,051,331 A | * | 4/2000 | Spear et al. .................. 429/34 |
| 6,136,412 A | | 10/2000 | Spiewak et al. ............. 428/143 |
| 6,326,097 B1 | | 12/2001 | Hockaday ..................... 429/34 |
| 6,361,892 B1 | * | 3/2002 | Ruhl et al. ..................... 429/30 |
| 6,471,993 B1 | * | 10/2002 | Shastri et al. ................ 424/486 |

FOREIGN PATENT DOCUMENTS

| | | |
|---|---|---|
| DE | 4119910 | 12/1992 |
| DE | 4320408 | 12/1994 |
| WO | WO8905707 | 6/1989 |
| WO | WO9628574 | 9/1996 |
| WO | WO0189018 | 11/2001 |

OTHER PUBLICATIONS

Kinsman G. et al: "Treatment of Metal Surface with Excimer Laser Radiation for Radiative Applications" Applied Optics, Optical Society of America, WA, US, vol. 32, No. 36, Dec 20, 1993, pp. 7462–7470, XP000425819.

Chun, William, et al., "Sputter Deposition of Catalysts for Fuel–Cell Electrodes", Dec. 1999, pp i, 1–4, National Aeronautics and Space Administration Contract No. NAS 7–918, NASA Tech Brief vol. 23, No. 12, Item # from JPL New Technology Report NPO–20250.

Lee, Sang–Joon J., et al., "Miniature Fuel Cells With Non–Planar Interface By Microfabrication", 198th meeting of the Electrochemical Society, Oct. 22–27, 2000, Phoenix, Arizona, 11pp.

* cited by examiner

Primary Examiner—Dah-Wei Yuan

(57) ABSTRACT

A method for roughening a surface of an ion exchange system structure using laser interaction with a surface. The laser surface roughening process allows the use of a wide range of substrates such as metals, ceramics, silicates, polymers and the like, including varieties which can not be fabricated in a fine fibrous structure. The surface roughened ion exchange system structure may be used as an ion-exchange media in applications such as fuel cells, batteries, and other catalysis systems where a high surface exchange area is desirable.

13 Claims, 7 Drawing Sheets

ION EXCHANGE SYSTEM STRUCTURE WITH A MICROTEXTURED SURFACE, METHOD OF MANUFACTURE, AND METHOD OF USE THEREOF

TECHNICAL FIELD

The technical field relates to microtextured surfaces in an ion exchange system structure and a method for making the same. The microtextured ion exchange system structure may be used in electrochemical devices, including fuel cells, batteries, sensors, electrolyzers and the like.

BACKGROUND

A desirable feature for ion-exchange media used in applications such as fuel cells, batteries, sensors, electrolyzers and other catalysis systems is the ability to deliver the highest exchange surface area while minimizing the size and weight of the entire system. An important metric used in comparing the performance of different system designs is the ratio of the exchange area to the volume of the system. For example, in a fuel cell, the increased contact area between the electrolyte, reactants and the catalytic surface results in an increase in the number of reactions per unit time. Therefore, the development of methods to increase surface area is critical to the improvement of technologies dependant on ion exchange. Common methods of increasing surface area fall into one of three categories, namely, microfibers, porous materials and roughened or microtextured surfaces.

With regard to the last category, a well known method for producing roughened surface on a nano scale is the plasma process. The process, however, requires high temperature and pressure that may damage certain substrates. Other methods of roughening include the impingement of sand or other particulates against a surface or the use of abrasives mounted on substrates; grinding wheels and sandpaper are examples. These processes, however, only provide limited surface area enhancement and are fraught with problems associated with contamination.

In catalysis systems, such as fuel cells, batteries, sensors, and electrolyzers, the ion exchange membrane is typically coated with a continuous or discontinuous layer of catalyst to promote the rates of chemical reactions. Commonly used catalysts include platinum (Pt) and Pt alloys, vanadium (V) and V alloys, titanium dioxide, iron, nickel, lithium and gold.

A fuel cell is an electrochemical apparatus wherein chemical energy generated from a combination of a fuel with an oxidant is converted to electric energy in the presence of a catalyst. The fuel is fed to an anode, which has a negative polarity, and the oxidant is fed to a cathode, which, conversely, has a positive polarity. The two electrodes are connected within the fuel cell by an electrolyte to transmit protons from the anode to the cathode. The electrolyte can be an acidic or an alkaline solution, or a solid polymer ion-exchange membrane characterized by a high ionic conductivity. The solid polymer electrolyte is often referred to as a proton exchange membrane (PEM).

The simplest and most common type of fuel cell employs an acid electrolyte. Hydrogen is ionized at an anode catalyst layer to produce protons. The protons migrate through the electrolyte from the anode to the cathode. At a cathode catalyst layer, oxygen reacts with the protons to form water. The anode and cathode reactions in this type of fuel cell are shown in the following equations:

$$\text{Anode reaction (fuel side)}: 2H_2 \rightarrow 4H^+ + 4e^- \quad (I)$$

$$\text{Cathode reaction (air side)}: O_2 + 4H^+ + 4e^- \rightarrow 2H_2O \quad (II)$$

$$\text{Net reaction}: 2H_2 + O_2 \rightarrow 2H_2O \quad (III)$$

The goal is complete hydrogen oxidation for maximum energy generation shown in the equation. However, the oxidation and reduction reactions require catalysts in order to proceed at useful rates. Catalysts are important because the energy efficiency of any fuel cell is determined, in part, by the overpotentials necessary at the fuel cell's anode and cathode. In the absence of an catalyst, a typical electrode reaction occurs, if at all, only at very high overpotentials.

One of the essential requirements of typical fuel cells, and indeed any ion exchange system, is easy access to the electrode and a large surface area for reaction. This requirement can be satisfied by using an electrode made of an electrically conductive porous substrate that renders the electrode permeable to fluid reactants and products in the fuel cell. To increase the surface area for reaction, the catalyst can also be filled into or deposited onto a porous substrate.

However, these modifications result in a fragile porous electrode that needs additional mechanical support. An alternative is to sinter a porous coating on a solid substrate and then fill or re-coat the porous coating with a catalyst. The sintering process, however, is a multiple step procedure that requires baking at high temperatures.

In U.S. Pat. No. 6,326,097 to Hockaday, a surface replica technique is used to form an "egg-crate" texture on a membrane in a micro-fuel cell. The catalyst and metal electrode are applied to the surface of the membrane, and then the membrane is etched away so that the catalyst and electrode surfaces replicate that texture. This procedure is complicated, requiring blind etching and many separate operations.

Others have used silicon micro machining to increase the effective surface area of an electrode (Lee, S. J. et al., Miniature Fuel Cells with Non-Planar Interface by Microfabrication. In: Power Sources for the New Millenium, Jain, M. et al. (eds.), Proceedings Volume 2000–22, The Ion exchange Society Proceeding Series, Pennington, N.J., 2000). Etching of silicon is a very time-consuming process.

SUMMARY

A process using laser interaction with a surface to enhance the production of ions at a surface of an ion exchange system structure is disclosed. In one embodiment, laser radiation is applied to a surface of an electrode substrate near an ablation threshold of the substrate to create a variety of shapes including cone-like and fibrous structures. In another embodiment, the laser radiation is applied to the surface of an electrode in an ion exchange membrane system to melt, boil or quench part of the surface to create a rough and porous layer at the surface. In yet another embodiment, an ion exchange membrane with a roughened surface is prepared by solidifying a solution on a laser roughened surface or in a mold having a laser roughened inner surface, or by stamping an ion exchange membrane substrate with a laser roughened surface.

The laser radiation can be applied to a surface of an electrode after fabrication of the electrode and, therefore, reduces the level of damage and/or contamination of the surface. Since the roughness is formed only where the laser beam strikes the surface, the surface roughening can be patterned to fit a specific application with very tight positional accuracy. In addition, the laser roughening operation can be performed quickly in an ambient environment by a batch process or on a continuous web, manufacturable process.

The laser surface roughening process allows the use of a wide range of electrode substrates such as polymers, ceramics, silicates, and the like, including varieties which can not be fabricated in a fine fibrous structure. Using the laser roughening method, a solid film may be treated to create enhanced surface areas in a single step as opposed to the multiple-step processing required to fabricate a non-woven solid composite. The surface roughened electrode may be used in an ion exchange system in applications such as fuel cells, batteries, and other catalysis systems where a high surface exchange area is desirable.

BRIEF DESCRIPTION OF THE DRAWINGS

The detailed description will refer to the following drawings, in which like numerals refer to like elements, and in which.

DETAILED DESCRIPTION

The interaction of laser radiation with a material may result in significant changes to the morphology of the surface and near surface of the material. There are a number of mechanisms by which the surface change may occur. Examples include: selective ablation by imaging the beam using contact or projection mask, ablation-induced cone formation, preferential ablation of the matrix of a multi-phase material, preferential etching of grain boundaries, boiling and rapid solidification of the surface material and other mechanisms. When properly controlled, the three-dimensional surface topography produced by these treatments results in a surface area that is many times greater than the original surface. The laser radiation thus provides another method for producing ion exchange membranes with enlarged exchange surfaces.

When light is applied to a light absorbing material, it is possible to change the surface of the material significantly and to form a plethora of different surface structures such as waves, ripples, pits, nodules, cones and cracks. The character of features produced is based on the mechanisms that create the features. The mechanisms themselves are varied and depend on the characteristics of the light and the nature of the interaction of the photons and the material.

Figure 1A:
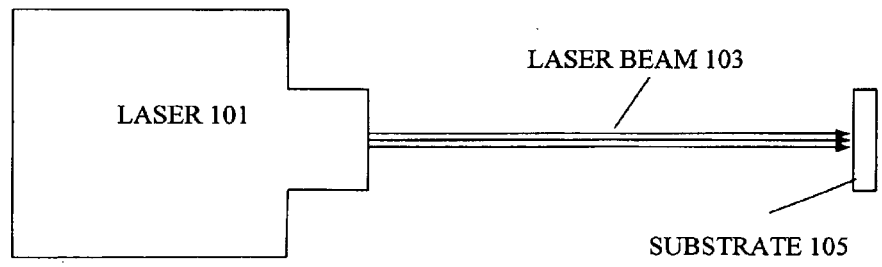
FIGS. 1A, 1B and 1C are schematics illustrating the equipment and process of cone formation on a surface by laser radiation.
Figure 1B:
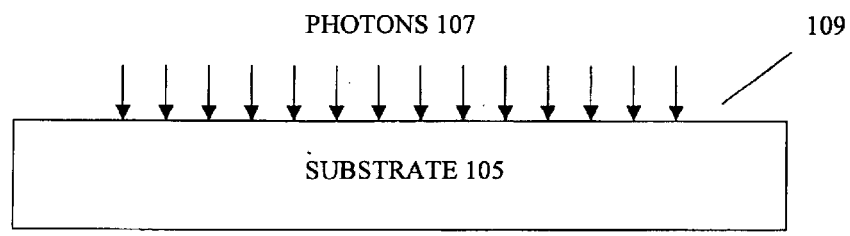
Figure 1C:
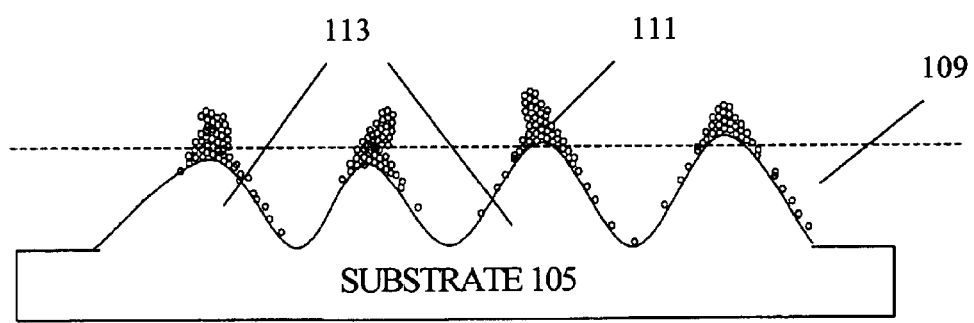
Figure 2:
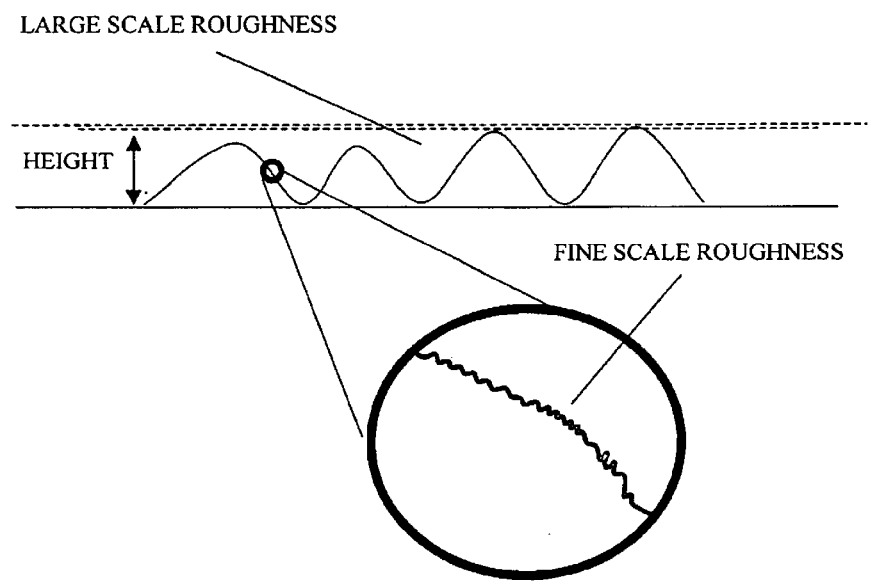
FIG. 2 is a schematic of a laser roughened surface where two scales of roughness are produced.

In one embodiment, an excimer laser 101 is directed towards a substrate 105 as shown in FIGS. 1A and 1B. The wavelength, fluence and energy of a laser beam 103 are chosen such that photons 107 remove material from surface 109 of the substrate 105 in a process known as ablation. During ablation, a plume of ablation debris 111 is ejected above the surface 109 of the substrate 105 (See FIG. 1C). By choosing the correct frequency and feed rate and a fluence that is above the substrate ablation threshold and below the debris ablation threshold, it is possible to encourage the resettling of the debris 111 back onto the surface 109 of the substrate 105. The resettled debris 111 will shadow portions of the underlying substrate material from the laser light and the substrate 105 will be ablated non-uniformly, forming a cone structure 113 as shown in FIG. 1C. The cone structure 113 with the debris 111 attached is a useful material for an ion exchange membrane. The laser ablation process creates two size orders of roughness on the surface of the substrate 105 (FIG. 2). A large-scale roughness (i.e., the cone structure 113) having a size on the order of 1–100 micron is created due to the shadowing provided by the debris 111. A fine scale roughness in the size range of tens of nanometers (indicated by the expanded portion of the diagram in FIG. 2) is created due to the deposited ablation debris 111. This combination of large scale and fine scale roughness significantly increases the surface area exposed for ion exchange.

Figure 3:
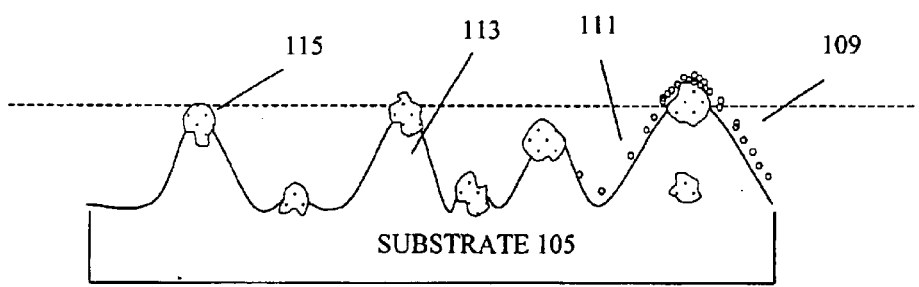
FIG. 3 depicts an embodiment of cone formation using particles imbedded in the substrate.

Redeposition of the debris 111 is just one of many methods capable of providing shading of the substrate 105 to form structures on the surface 109. FIG. 3 shows another embodiment where particles 115 of higher ablation threshold have been pre-deposited inside the substrate 105. The substrate surface 109 is ablated down to expose the particles 115, which then shadow the underlying material forming the cone structure 113. In other embodiments not shown, various masks may be inserted between the light source and the substrate 105 or deposited on the surface of the substrate 105. Examples of masks include contact masks, projection masks, films, particles and coatings deposited on the surface and the like. Diffractive optics may be used to project an image on the surface 109.

There are other embodiments where the mechanisms are quite different. For example, in metals and glasses, it is possible to melt and even boil the surface of the substrate with a laser thereby forming a rough surface.

Membrane materials that may be surface treated by laser radiation include, but are not limited to, metals, plastics, silicon, ceramics and composites there of. Any material that can be manipulated with a laser is a potential candidate. The types of light sources capable of inducing such changes on the surface of a material are well known in the art. Examples include gas lasers such as excimer and solid state lasers such as YAG lasers as well as flash lamps, UV exposure tools and the like. What is important is to match the material with a light source that will interact with the desired material sufficiently to provide the roughening effect.

Figure 4:
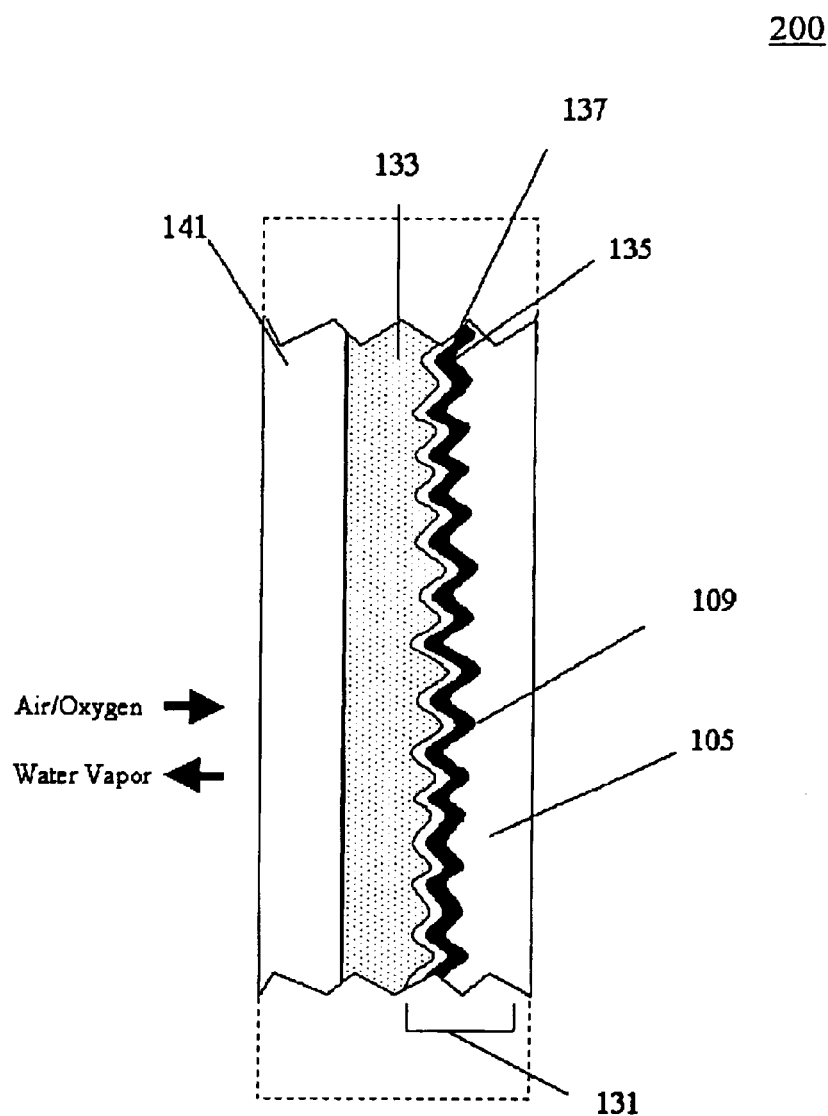
FIG. 4 shows an alkaline direct methanol fuel cell with a surface-roughened electrode.

The membrane with laser roughened surface may be used in applications such as fuel cells, batteries, and other catalysis systems where a high surface area to volume ratio is desirable. FIG. 4 shows an embodiment where a laser treated substrate is used in an electrode 131 of an alkaline direct methanol fuel cell 200. In this embodiment, the alkaline direct methanol fuel cell 200 contains an anode 131 (fuel electrode) and a cathode 141 (air electrode), separated by fuel/electrolyte mixture 133. The fuel/electrolyte mixture 133 may be methanol (fuel) dissolved in a KOH solution (electrolyte). The fuel/electrolyte mixture 133 is in full contact with both the anode 131 and cathode 141. The application of surface roughened material in the anode 131 would amplify the effective surface reaction area and result in a higher reaction rate.

The anode 131 may include a plastic substrate 105, such as Kapton or any other suitable polymer, with a laser textured surface 109 that is covered with a conductive layer 135 and a catalyst layer 137. The conductive layer 135 may be formed by depositing onto the textured surface 109 a conductive material by electroless plating, sputtering, atomic layer deposition, or any other process that is capable of coating the surface of a non-conductive material. The conductive material may be any material of interest such as Ni, Cu, Al, Fe, Zn, In, Ti, Pb, V, Cr, Co, Sn, Au, Sb, Ca, Mo, Rh, Mn, B, Si, Ge, Se, La, Ga, Ir, or an alloy. The catalyst layer 137 may be Pt or Pt alloys such as Pt—Ru and Pt—Ru-Osor, V, V alloys, titanium dioxide, iron, nickel, lithium, gold, or any other material of interest. The catalyst layer 137 may be deposited onto the conductive layer 135 by electroplating, atomic layer deposition, chemical vapor deposition, sputter deposition or any other process that is capable of coating a conductive surface. The catalyst may be applied so that it forms a discontinuous surface layer 137 over the conductor layer 135. The formation of a discontinuous catalyst layer 137 is facilitated by the cone structure, upon which catalytic material can be preferentially applied to the tops of the cones. Alternatively, the non-conductive textured surface 109 may be directly coated with a continuous catalyst layer 137 (which will serve both conductive and catalytic functions) by atomic layer deposition, chemical vapor deposition, sputter deposition or any other process that is capable of coating a non-conductive surface.

Figure 5:
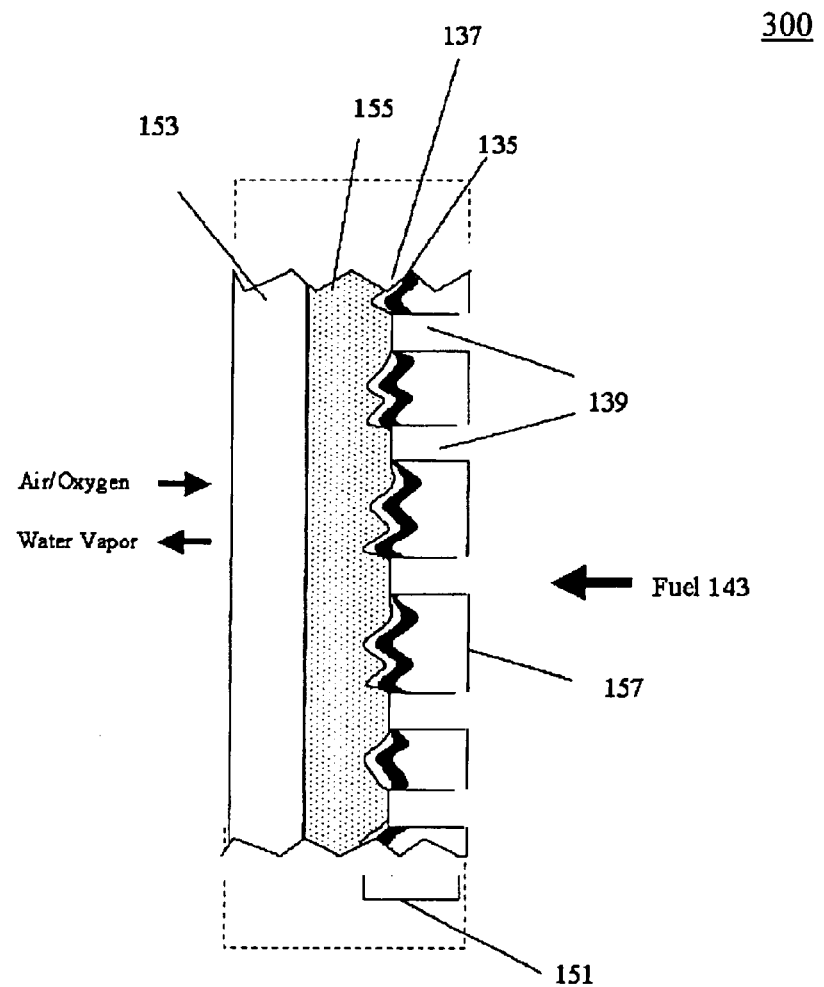
FIG. 5. shows a direct methanol fuel cell with a surface-roughened flex as PEM.

FIG. 5 depicts another embodiment utilizing the surface roughened electrode membrane in a fuel cell with a solid polymer electrolyte membrane (PEM). In this embodiment, a fuel cell 300 contains an anode 151 (fuel electrode) and a cathode 153 (air electrode), separated by a PEM 155. The anode 131 is made from a surface roughened flex material 157 covered with a conductor layer 135 and a catalyst layer 137. The surface roughened flex material 157 is thinned and etched from the back side to form micro-machined pores 139 so that fuel 143 on the anode side can reach the active catalytic surfaces 137 through the openings 139. Here again, the surface roughening of the flex material 157 provides higher reaction rates and more efficient operation.

Figure 6A:
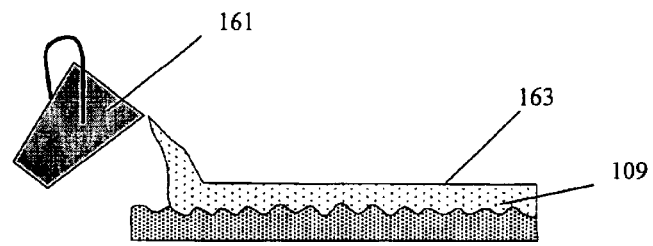
FIGS. 6A, 6B and 6C depict the use of a roughened surface as a mold or embossing tool for producing PEM.
Figure 6B:
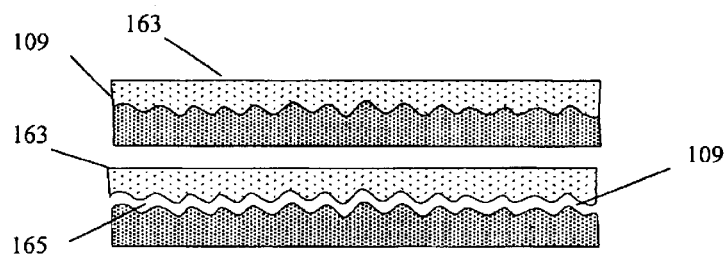

In another embodiment, a substrate with laser-roughened surface is used as a mold or a stamp to produce a PEM with a roughened surface or surfaces. As shown in FIG. 6A, an electrolyte material is melted or mixed with a solvent to form a solution 161. The solution is cast onto a laser roughened surface 109 and allowed to solidify into a membrane 163, which is then separated from the surface 109. In this manner, a surface 165 of the membrane 163 is a negative relief of the laser roughened surface 109 (FIG. 6B). The membrane 163 then may be covered with a conductor 135 and a catalyst 137 and may be used as a PEM for a fuel cell.

Figure 6C:
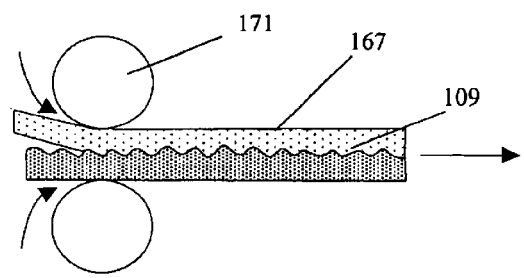

The electrolyte material includes, but is not limited to, sulfonated, phosphonated, or carboxylated ion-conducting aromatic polymer and perfluorinated co-polymer. The solvent includes, but is not limited to, lower aliphatic alcohols such as propanol, butanol, and methanol and water or a mixture thereof FIG. 6C depicts another embodiment wherein an ion exchange membrane 167 with a textured surface is produced by stamping the membrane 163 and a laser roughened surface 109 with a roller 171.

In yet another embodiment, the solution 161 may be poured into a mold having laser roughened inner surfaces to form an ion exchange membrane 163 with textured surfaces on both the up-side and lower side of the membrane.

The ion exchange membrane with textured surfaces on both sides may be used as a PEM in a PEM-electrode structure, wherein both sides of the PEM are covered by conductor layers and catalyst layers. Porous electrodes that allow fuel delivery and oxygen exchange can then be pressed against the catalyst layers of the PEM to form the PEM-electrode structure.

Although embodiments and their advantages have been described in detail, various changes, substitutions and alterations can be made herein without departing from the spirit and scope of the laser roughening process and the use of surface roughened products as defined by the appended claims and their equivalents.

What is claimed is:

1. A substrate for an ion-exchange electrode structure, said substrate comprising an exterior surface wherein at least a portion of the exterior surface is irradiated by a laser radiation to enlarge a reactive surface area on the exterior surface, wherein the reactive surface area has two-scales of roughness, a first scale of roughness at least three orders of magnitude different than a second scale of roughness.

2. The substrate of claim 1, wherein the portion of the surface is irradiated by exposing the surface to the laser radiation near an ablation threshold of the substrate.

3. The substrate of claim 1, wherein the portion of the surface is irradiated by melting, boiling, or quenching part of the surface with laser radiation.

4. The substrate of claim 1, wherein the laser irradiated surface is coated with a layer of conductive material.

5. The substrate of claim 4, wherein the conductive material is a metal or an alloy.

6. The substrate of claim 4, wherein the layer of conductive material is further coated with a continuous or discontinuous layer of catalytic material.

7. The substrate of claim 6, wherein the catalytic material is selected from a group consisting of Pt, Pt alloys, V, V alloys, titanium dioxide, iron, nickel, lithium and gold.

8. The substrate of claim 1, wherein the laser irradiated surface is coated with a continuous or discontinuous layer of catalytic material.

9. The substrate of claim 8, wherein the catalytic material is selected from a group consisting of Pt, Pt alloys, V, V alloys, titanium dioxide, iron, nickel, lithium and gold.

10. The substrate of claim 8, further comprising micro openings wherein a fuel flows through the micro openings to reach the catalytic material.

11. The substrate of claim 1, wherein the reactive surface area includes a projecting surface feature.

12. The substrate of claim 11, wherein the projecting surface feature is cone-shaped.

13. The substrate of claim 1, wherein the first scale of roughness is about $10^{-6}$ meters.

* * * * *